Sept. 21, 1971  W. RAST  3,606,807
BAR FEED TUBES OF LATHES
Filed April 7, 1969  3 Sheets-Sheet 2

Inventor:
Wlodzimierz Rast
By: Oldham and Oldham
Atty.

3,606,807
BAR FEED TUBES OF LATHES
Wlodzimierz Rast, Eden Hills, South Australia, Australia, assignor to Rast Patents Pty. Ltd., Adelaide, South Australia, Commonwealth of Australia
Filed Apr. 7, 1969, Ser. No. 813,976
Claims priority, application Australia, Apr. 10, 1968, 36,286/68
Int. Cl. B23b 25/00
U.S. Cl. 82—38R                 5 Claims

ABSTRACT OF THE DISCLOSURE

A bar feed for lathes wherein relatively long bars are fed through a tube by a push rod which is characterised by at least one bar steady in an opening in the feed bar tube comprising jaws coaxially arranged about the bar and guiding the bar when the bar is of a length to extend beyond the steady, but permitting the bar to slide through the steady when the jaws are opened as the push rod reaches the said steady.

---

This invention relates to improvements in and to the bar feed tube of lathes.

One of the problems associated with the bar feed tubes of lathes is the amount of vibration which is caused when the bar is revolving at a relatively high speed and is supported only at the two ends, that is one end is supported by the chuck and the other end is supported by the push rod by means of which the bar is fed forward.

Under such conditions the centre of the bar is free to bow and during rotation sets up a considerable amount of vibration and noise in that the centre of the bar tends to strike the inside of the feed tube, particularly when the bar is of a substantial length.

Certain difficulties exist in trying to solve the problem of vibration in these rods because the rod is fed forward by means of a push rod and the push rod must therefore pass through the member which would steady the centre of the bar at the commencement of operation.

The object of this invention is to provide an improved bar feed tube arrangement by means of which an intermediate point of the bar can be steadied in a bearing of suitable type whereby it is assured that vibration of the bar will not take place. It will be realised that when a bar is engaged at one end in a chuck and is guided at the rear end by a push rod having a conical front, and is also engaged and steadied at an intermediate point, the tendency to vibration is avoided because of the three point holding of the bar.

Certain problems exist however in such an arrangement because obviously as the feed tube has a push rod within it which is only very slightly smaller than the inside bore of the feed tube, any support within the feed tube cannot be located in its bar engaging position when the push rod moves forward beyond the point of this support, and therefore a further object of this invention is to so arrange the assembly that the support is moved out of position to allow the push rod to move through when the bar which is being fed has been appropriately shortened.

The objects of the invention are achieved by providing at one or more points a bearing adapted to engage the bar within the feed tube but so arranging the bearing that it can be withdrawn to allow the push rod to pass through the location where the bearing is normally positioned.

A simple way of achieving this is to provide a gap in the feed tube at appropriate points and to position in the gap a two-part steady jaw which can be opened to clear the feed tube for passage of the push rod or can be closed to engage the bar which is being fed, the jaws being provided with means which allow bars of different shape and size to be engaged with the required fit whereby vibration of the bar is prevented.

In the case of round bars the jaws can simply have an insert or inserts of a size such that when the jaws are closed the bar is neatly engaged by these inserts but loosely enough to allow the bar to revolve and to move axially through the jaws, but in the case of the bar which is of other than round cross-section it may be desirable to arrange the inserts so that they can rotate within the jaw to be driven by the bar as it revolves with the chuck.

The jaws can be conveniently operated by air or can be manually or mechanically controlled, and trip means are provided which are so arranged that when the end of the push rod reaches the locality of the jaws these are opened to allow the push rod to pass therethrough to continue the feed of the bar.

To enable the nature of the invention to be fully appreciated, embodiments will now be described with reference to the accompanying drawings but it is to be clear that the invention need not necessarily be limited to these embodiments.

Figure 1:
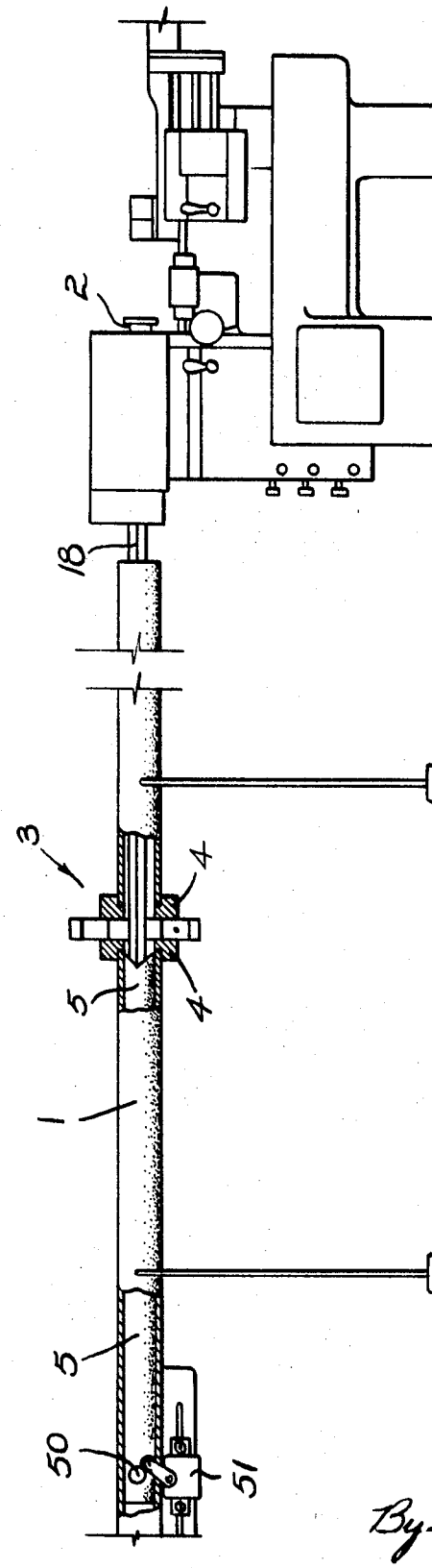
FIG. 1 is a side elevation of a lathe with the improved bar feed.

The bar feed tube 1 of the lathe 2 is provided with an opening 3 disposed between a pair of flanges 4 secured to the two parts of the feed tube 1 at the locality of the steady which is to be provided by a pair of jaws, the gap or opening 3 being of course bridged or the two parts of the feed tube being supported to allow the feed tube to extend the required distance in a relatively continuous manner so that the push rod 5 can operate the full required distance.

Figure 2:
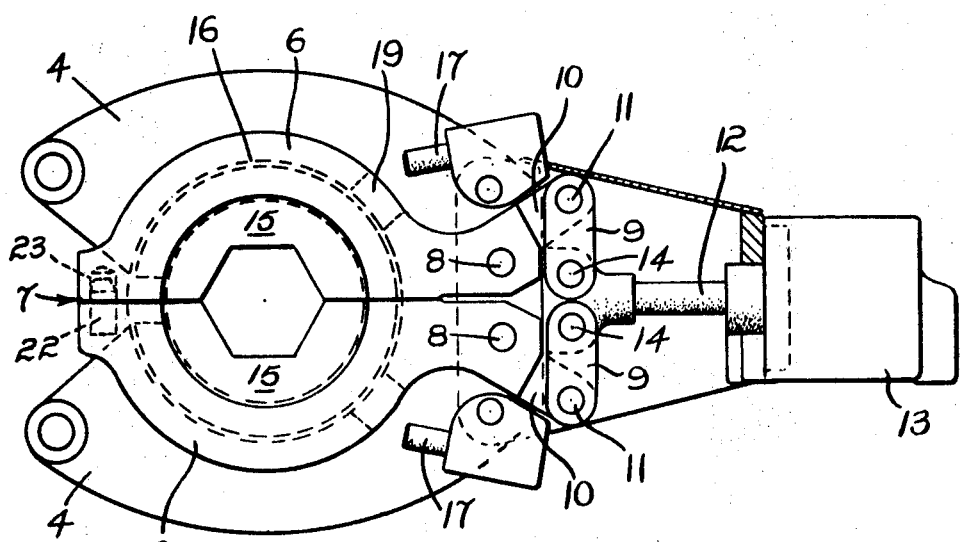
FIG. 2 is a side elevation to an enlarged scale of one form of a steady jaw in its closed position.
Figure 3:
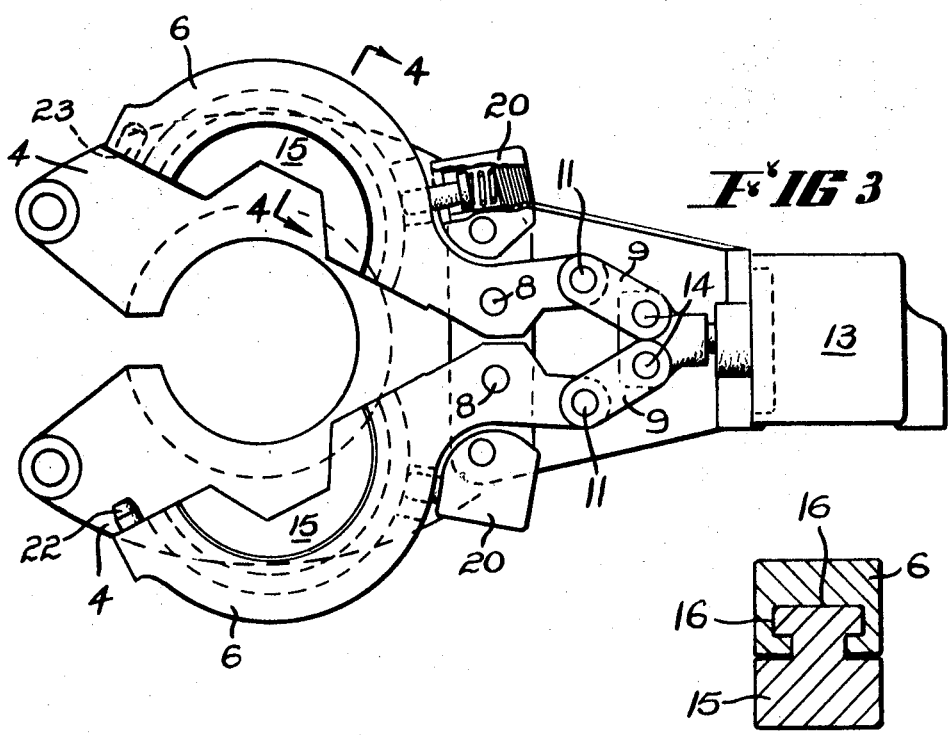
FIG. 3 is the jaw in its open position.

Disposed within the gap 3 so formed are a pair of jaws 6 which are split on the centre line 7 of the bar feed tube and are connected by hinge pins 8 to a support, in the case shown, the flanges 4 of the feed tube, so that these jaws 6 can be closed to be concentrically positioned in relation to the bar feed tube as shown in FIG. 2 but can be open so that the two jaws completely clear the tube as shown in FIG. 3.

The jaws 6 are provided with toggle links 9 at overhanging portions 10, which toggle links 9 have their one end connected by pins 11 to the overhanging portions 10 and their other ends connected to the plunger 12 of an air cylinder 13 by pins 14, the arrangement being such that when the plungers 12 of the air cylinder 13 is projected inwardly these toggle links 9 are brought into line or into a locking position to hold the jaws 6 closed, but when the piston within the air cylinder 13 is retracted, the toggle links 9 will move the two jaws about their hinge pins 8 to open the jaws to clear the feed tube as shown in FIG. 3.

In the case of a rotary insert 15 as shown in FIGS. 2 and 3 which is to engage bars of other than round cross-section, two halves are used, the jaws being recessed in such a manner that these two half inserts 15 can be fed into the recesses 16 in the jaws 6 when they are in their open position (FIG. 3) but when the jaws are closed the two halves are forced together (FIG. 2) to form a complete but split ring which is then held in position within the jaws but is free to revolve in tracks 16 within the jaws (FIG. 4), such an arrangement allowing inserts of various size to be positioned to engage bars of the appropriate cross-section, the bar and the inserts then rotating but the bar being able to slide through the inserts as it is fed forwardly by the push rod.

It will be obvious that the jaws under these conditions can only open when the two inserts have their split in line with the split formed between the two jaws and as the feed is by means of an air cylinder it will be realised that the pressure can be exerted and the jaws will open at the appropriate time when the inserts are correctly orientated Spring loaded pins 17 are provided to lock the inserts immediately the jaws open so that the inserts cannot be vibrated out of position at this time because obviously the jaws will be opened long before the push rod 5 has fed the bar 18 forwardly the full amount and in the case of where a single steady is used at say the centre of the initial length of the bar it is obvious that the steady will operate only during the first half of the stroke of the push rod and the remaining feed will take place after the push rod forward end has passed through the position where the bar was previously steadied. The pins 17 operate through apertures 19 in the jaws 6, the pins and their springs being supported in housings 20 as shown more particularly in the part section in FIG. 3.

Locating means between the two jaws can be provided such as a pin 22 and socket 23 to ensure that the jaws when closed will be correctly aligned, this being particularly necessary in the case where the inserts 15 revolve with the bar 18.

Figure 4:
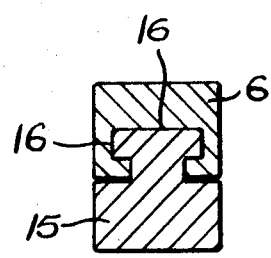
FIG. 4 is a section on line 4—4 of FIG. 3.

As the cross-section of the inserts 15 is T shape as shown in FIG. 4 with the top part of the T housed in an appropriately shaped track 16 in the jaws 6 these inserts are free to rotate when the bar 18 turns.

Figure 5:
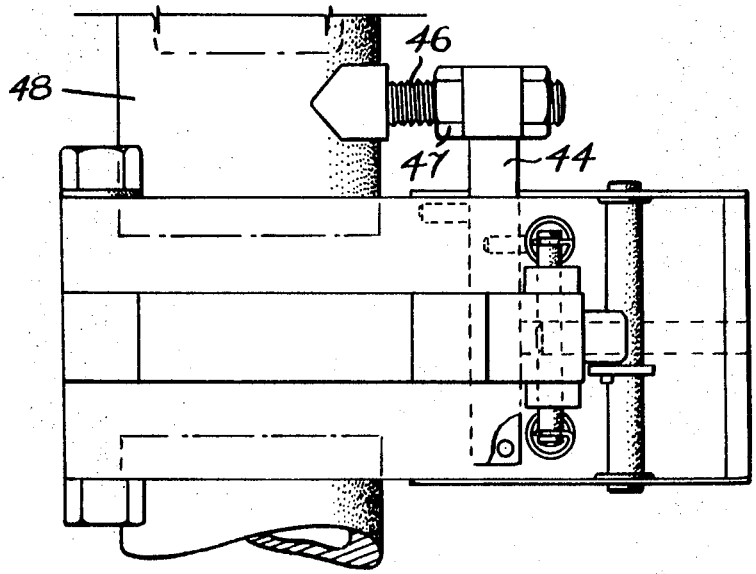
FIG. 5 is a plan of modified jaws.
Figure 6:
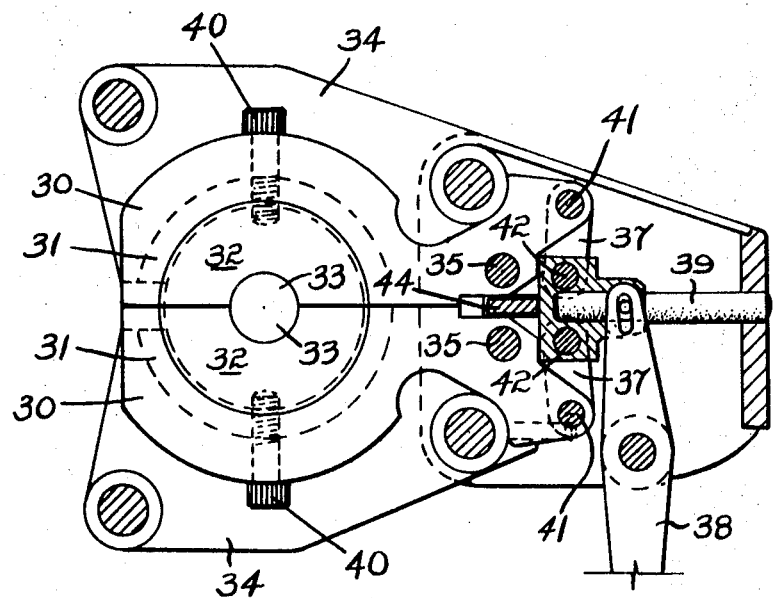
FIG. 6 is a side elevation of the jaws shown in FIG. 5.

It will of course be obvious that instead of rotating the inserts, fixed inserts can be used, as shown in FIGS. 5 and 6, and this is possible also with bars other than of round cross-section because the inserts 15 can simply be selected to be of such a size that when fitted together they will provide a bearing member for an intermediate point of the bar 18, but whether or not a rotational insert is used will depend largely on the requirements and the type of bars being fed. The inserts 15 of course have a complementary shape to the bar when the insert is to revolve such as when using a hexagonal bar.

In FIGS. 5 and 6, the jaws 30 are again provided with recesses 31 in which are carried the inserts 32 which each have a semi-circular opening 33 to receive the bar but in this case the inserts 32 do not rotate as the bar is allowed to rotate within them, the purpose of having the inserts removable being to allow bars of different diameter to be accommodated by correspondingly dimensioned openings 33.

The hinge pins 35 connect the jaws 30 to the flanges 36 of the feed bar tube and toggle links 37 are again used but in this case a mechanical operation of the jaws is shown comprising a stem 38 operated by a control member 39 from any suitable source.

The set screws 40 lock the inserts 32 to the jaws 30.

The pins 41 and 42 correspond respectively to the pins 11 and 14 of the first embodiment.

An adjusting bar 44 coupled to the feed bar tube 48 through the threaded stem 46 and nuts 47 allows the degree of closing of the jaws to be defined.

In both cases, trip means 50 are provided in association with the push rod 5 so arranged that when the forward end of the push rod approaches the locality of the steady, the jaws are opened to clear the way for the push rod to continue its motion through the feed tube until the bar has been completely fed to the chuck.

In FIG. 1 the push rod 5 operates a valve 51 which controls jaw movement such as by being connected to the cylinder 13.

Any other means can however be used and it will be realised that mechanical operation of the jaws is possible which could again well be timed with movement of the push rod to ensure that the jaws open prior to the end of the push rod reaching them, closing of the jaws being similarly timed by the push rod mechanism where this is required.

It will be realised of course that a single bar steady unit can be used or as said a series of these could be provided along the feed tube, and it would be possible for instance to have one near the chuck of the feed tube and another further back along the feed tube, each being opened at appropriate time as the end of the push rod approaches it, but generally a single bar steady unit is all that may be required with normal length rods and this can be positioned approximately at the centre of the initial bar length so that it steadies the centre of the bar when the greatest danger of vibration exists and continues to form with the chuck and the push rod a three point suspension of the bar during the critical period.

From the foregoing it will be realised that a simple and effective device is provided which because of its split or similarly shaped nature is able to engage a bar of selected size by providing a correct insert but which allows the push rod to pass the locality of the steady during the shortening of the bar as it is fed to the chuck of the lathe.

While several embodiments of the invention have been disclosed herein, it will be appreciated that modification of these particular embodiments of the invention may be resorted to without departing from the scope of the invention as defined in the appended claims.

What I claim is:

1. Improvements in and relating to the bar feed tubes of lathes in which a bar is fed through a tube by a push rod characterized by the use of at least one opening in the said feed bar tube, and in the opening a bar steady comprising jaws coaxially arranged about the bar and guiding said bar when the bar is of a length to extend beyond the said steady but permitting the bar to slide therethrough, means to open the said jaws when the push rod reaches the said steady to then allow the push rod to continue feed of the bar while maintaining the jaws in an open position, said jaws being recessed, and inserts engaged in the said recesses and in turn engaging the said bar whereby the inserts rotate with the bars.

2. Improvements in and relating to the bar feed tubes of lathes in which a bar is fed through a tube by a push rod characterized by the use of at least one opening in the said feed bar tube, and in the opening a bar steady comprising jaws coaxially arranged about the bar and guiding said bar when the bar is of a length to extend beyond the said steady but permitting the bar to slide therethrough, means to open the said jaws when the push rod reaches the said steady to then allow the push rod to continue feed of the bar while maintaining the jaws in an open position, hinging means on the jaws engaging flanges on the feed bar tube and links connecting said jaws to an operating mechanism adapted to move the links to open or close the jaws, said links being connected respectively to the jaws and operating means by means so positioned that in closed position the links are substantially in line to lock the jaws.

3. An improved bar feed according to claim 2 wherein the jaws carry inserts which between them define a circle and close on to a bar, the inserts being insertable in recesses in the jaws when the jaws are open but rotatable in the recesses as a ring when the jaws are closed, and means whereby the inserts are held in the jaws when the jaws are opened with one insert engaged in each of the jaws.

4. Improvements in and relating to the bar feed tubes of lathes in which a bar is fed through a tube by a push rod characterized by the use of at least one opening in the said feed bar tube, and in the opening a bar steady comprising jaws coaxially arranged about the bar and guiding said bar when the bar is of a length to extend beyond the said steady but permitting the bar to slide therethrough, means to open the said jaws when the push rod reaches the said steady to then allow the push rod to continue feed of the bar while maintaining the jaws in an open position, said jaws being pivotally held in an opening in the said feed bar tube and interconnected to open or close simultaneously by means of toggle links connected to the said jaws, said toggle links being commonly connected at their other ends to an operating member, and means on the said tube actuated by the said push rod to open the jaws when the advancing end of the push rod approaches the jaws whereby the jaws open to allow the push rod to feed the bar past the said jaws without intermediate guiding means for the bar.

5. An improved bar feed according to claim 1 where said recesses in said jaws combine, when said jaws are closed, to define an annular recess in which said inserts can rotate, and means to retain said inserts stationary when said jaws are open.

References Cited
UNITED STATES PATENTS

| | | | |
|---|---|---|---|
| 1,184,614 | 5/1916 | Brightman | 82—912X |
| 1,506,108 | 8/1924 | Brophy | 82—38.1X |
| 3,253,488 | 5/1966 | Romano | 82—38.1 |
| 233,672 | 10/1880 | Haley | 279—106X |

LEONIDAS VLACHOS, Primary Examiner